3,057,927
PROCESS FOR THE MANUFACTURE OF GUAIACOL

Dale W. Read, Toronto, Ontario, Canada, assignor to Ontario Research Foundation, Toronto, Ontario, Canada
No Drawing. Filed June 6, 1960, Ser. No. 33,906
13 Claims. (Cl. 260—613)

This invention relates to a process for producing guaiacol. In particular, this invention relates to a process for producing guaiacol from acetovanillone. Even more particularly this invention relates to a process for producing guaiacol by heating acetovanillone with certain Lewis acids and recovering the guaiacol distillate.

Various methods have been proposed for producing guaiacol, which is particularly useful in veterinary medicines and also is employed in the disinfectant field.

L. Weschky in German Patent No. 827,803 describes a process for producing guaiacol by treating o-dihydroxy benzene with methanol or dimethyl ether at elevated temperatures with a dehydrating agent.

Typical of another method is that described in United States Patent No. 2,390,063 to Freudenberg and Lautsch in which lignin or waste sulphite liquor is hydrogenated at 30–120 atmospheres with temperatures up to 260° C. Ether-soluble phenols are obtained in yields of from 50% to 60% and consist of a mixture of guaiacol, pyrocatechol, cresols and other phenols.

United States Patent No. 1,623,949 to I. Gubelmann, H. J. Weiland and O. Stallmann describes a type of synthesis for producing pure guaiacol which involves the decomposition of diazo-o-anisole in the presence of a salt such as copper phosphate and in the absence of free sulphuric acid.

Prior art methods for producing guaiacol, typical of which are those just described, are relatively expensive and/or involve the use of costly equipment.

Accordingly, it is a prime object of my invention to provide a process for the production of relatively pure guaiacol which is cheaper than other known processes.

It is another object of my invention to provide a process for the production of guaiacol which does not involve the use of costly starting materials.

A further object of my invention is to provide a process for producing guaiacol without the necessity of employing costly equipment.

Yet another object of my invention is to provide a process for producing guaiacol which requires a minimum amount of manipulation.

Still another object of my invention is to provide a fast-acting process for producing guaiacol.

Other objects and advantages of my invention will become apparent from the following detailed description prefaced by a brief description of my new process.

Briefly, in accordance with my invention, guaiacol is produced by heating acetovanillone in the presence of one or more catalysts from the group consisting of zinc chloride, zinc bromide, orthophosphoric acid, polyphosphoric acid and phosphorus pentoxide, and cooling the vapour given off to recover a guaiacol distillate.

In greater detail, I have found that relatively pure guaiacol may be produced, with optimum yields being given about twenty minutes after the reaction temperature is attained, by heating acetovanillone in distilling apparatus to a temperature (preferably 250° C. to 300° C.) greater than the boiling point (about 205° C.) of guaiacol in the presence of a catalyst from the group consisting of zinc chloride, zinc bromide, orthophosphoric acid, polyphosphoric acid, phosphorus pentoxide and mixtures thereof, and recovering the guaiacol distillate.

Preferably the acetovanillone should be heated to temperatures between 250° C. and 300° C. The lower temperature limit of my process is dictated by the temperature at which guaiacol distills over for a reasonable recovery, and the upper temperature limit is dictated by the necessity of preventing thermal decomposition of the reactants.

Acetovanillone is produced as a by-product during the production of vanillin from lignin and it may be obtained in a crude form associated with other products of the lignin hydrolysis reaction. This impure acetovanillone as well as the purified material are satisfactory starting materials for the production of guaiacol according to the present invention.

The following are two examples of specific processes within the scope of my invention and are in no may to be construed as limiting in nature.

EXAMPLE I

To each of two flasks containing 10 parts by weight of acetovanillone 0.5 and 1.0 part respectively of zinc chloride were added. The flasks containing the reactants were heated in an oil bath at 165° C. to 170° C. for a half hour. The temperature then was increased over a fifteen minute period to 260° C. to 275° C. Most of the distillate came over in the first fifteen to twenty minutes after the temperature was raised to 260° C. The yield of pure guaiacol from the flask containing 10 parts by weight of acetovanillone and 0.5 part by weight of zinc chloride was 3.8 parts by weight, i.e. approximately a 40% yield on a weight basis. The yield of pure guaiacol from the other flask was 3.7 parts by weight. By continuing the reaction for two to three hours the yield of guaiacol was raised from 0.1 to 0.2 part.

EXAMPLE II

The above experiment was repeated with the same reactants in the same proportions, but the flasks were placed in an oil bath at 260° C. and the temperature was increased over a three hour period to 300° C. At least 90% of the distillate came over in the first twenty minutes, and the total yields of pure guaiacol were 3.0 and 3.6 parts by weight (using 0.5 and 1.0 part by weight of zinc chloride).

The results of these and other experiments are tabulated in the following table:

Table I
YIELDS OF GUAIACOL FROM TEN PARTS OF ACETOVANILLONE

| Parts catalyst: | Parts guaiacol [1] |
|---|---|
| 0.15 zinc chloride | 0.3 |
| 0.25 zinc chloride | 0.5 |
| 0.35 zinc chloride | 2.5 |
| 0.50 zinc chloride | 3.8 |
| 0.60 zinc chloride | 3.7 |
| 0.70 zinc chloride | 3.8 |
| 0.5 zinc bromide | 2.0 |
| 1.7 orthophosphoric acid (85%) [2] | 1.8 |
| 2.5 orthophosphoric acid (85%) | 3.4 |
| 5.0 orthophosphoric acid (85%) | 3.6 |
| 7.5 orthophosphoric acid (85%) | 3.6 |
| 0.9 polyphosphoric acid [3] | 1.0 |
| 1.8 polyphosphoric acid | 2.7 |
| 2.6 polyphosphoric acid | 2.5 |
| 3.4 polyphosphoric acid | 2.9 |
| 1.0 phosphorus pentoxide | 2.5 |

[1] This yield does not include a guaiacol-containing fore-run (B.P. from 125 to 195° C.), which amounted to about 0.9 part in each case.
[2] With orthophosphoric acid, an additional fore-run of about 2 parts of water was obtained.
[3] Polyphosphoric acid was prepared by mixing 15 parts of phosphorus pentoxide with 85 parts of 85% orthophosphoric acid and warming to about 150° C. until solution was complete.

Along with zinc chloride and zinc bromide, phosphorus pentoxide ($P_2O_5$), orthophosphoric acid ($H_3PO_4$) and polyphosphoric acid were found to be suitable catalysts. Polyphosphoric acid was prepared by heating phosphorus pentoxide and orthophosphoric acid. A mixture of orthophosphoric acid, pyrophosphoric acid ($H_4P_2O_7$) and polymers of phosphoric acid of various chain lengths therefore would result.

When a phosphoric acid, such as orthophosphoric acid, is heated to temperatures such as those used in the preparation of guaiacol in accordance with my invention, there occurs a loss of water with the formation of pyrophosphoric acid and, of course, further polymerization to polyphosphoric acid.

The foregoing experiments were carried out using simple micro distilling equipment and it is believed that probably higher yields of pure guaiacol would be obtained by employing larger distillation equipment with efficient fractionating columns.

While I have described my invention in considerable detail, I do not wish to be limited thereby, and it will be apparent that various modifications of my invention may be made without departing from the spirit and scope of my invention as defined in the appended claims.

What I claim as my invention is:

1. A process for producing guaiacol which comprises (a) heating acetovanillone to a temperature greater than the boiling point of guaiacol and not greater than about 300° C. in the presence of a catalyst selected from the group consisting of zinc chloride, zinc bromide, orthophosphoric acid, polyphosphoric acid, phosphorus pentoxide and mixtures thereof, and (b) cooling the vapour given off to recover a guaiacol distillate.

2. A process according to claim 1 wherein said catalyst is zinc chloride.

3. A process according to claim 1 wherein said catalyst is zinc bromide.

4. A process according to claim 1 wherein said catalyst is orthophosphoric acid.

5. A process according to claim 1 wherein said catalyst is polyphosphoric acid.

6. A process according to claim 1 wherein said catalyst is phosphorus pentoxide.

7. A process according to claim 1 wherein said acetovanillone is heated to between about 250° C. to 300° C.

8. A process according to claim 7 wherein said catalyst is zinc chloride.

9. A process according to claim 7 wherein said catalyst is zinc bromide.

10. A process according to claim 7 wherein said catalyst is orthophosphoric acid.

11. A process according to claim 7 wherein said catalyst is polyphosphoric acid.

12. A process according to claim 7 wherein said catalyst is phosphorus pentoxide.

13. A process for producing guaiacol which comprises (a) heating acetovanillone in distilling apparatus to a temperature between about 250° C. to 300° C. in the presence of a catalyst selected from the group consisting of zinc chloride, zinc bromide, orthophosphoric acid, polyphosphoric acid, phosphorus pentoxide and mixtures thereof, and (b) recovering the guaiacol distillate.

References Cited in the file of this patent

Favorskii et al.: Chem. Abs., vol. 30, p. 2941 (1936).